United States Patent [19]

Klimowicz et al.

[11] Patent Number: 4,501,299
[45] Date of Patent: Feb. 26, 1985

[54] PLUNGER-TYPE VALVE

[75] Inventors: Michael A. Klimowicz, Cupertino, Calif.; Vytautas J. Toliusis, Paw Paw Township, Van Buren County; Stanley M. Loveless, Oshtemo Township, Kalamazoo County, both of Mich.

[73] Assignee: Humphrey Products Company, Kalamazoo, Mich.

[21] Appl. No.: 380,574

[22] Filed: May 21, 1982

[51] Int. Cl.³ .................. F16K 11/02; F16K 31/05
[52] U.S. Cl. ..................... 137/625.65; 137/625.5; 251/130; 251/139; 251/141; 251/297; 251/333; 251/365
[58] Field of Search ........... 251/130, 139, 141, 297, 251/333, 359, 365; 137/625.5, 625.65

[56] References Cited

U.S. PATENT DOCUMENTS

| | | | |
|---|---|---|---|
| 1,664,613 | 4/1928 | French | 251/139 |
| 1,773,110 | 8/1930 | Meyers . | |
| 2,210,046 | 8/1940 | Schubring . | |
| 2,471,880 | 5/1949 | MacDonald . | |
| 2,828,936 | 4/1958 | Hales | 251/141 X |
| 2,829,861 | 4/1958 | Wright | 251/130 |
| 2,928,646 | 3/1960 | Ashbrook . | |
| 3,236,494 | 2/1966 | Frantz | 251/139 |
| 3,416,381 | 12/1968 | Allen | 251/130 X |
| 3,420,494 | 1/1969 | Egner | 251/130 |
| 3,444,895 | 5/1969 | Schnittker . | |
| 3,632,081 | 1/1972 | Evans | 251/333 X |
| 3,647,177 | 3/1972 | Lang . | |
| 3,677,826 | 7/1972 | Pointout et al. . | |
| 3,762,683 | 10/1973 | Sangl | 251/139 |
| 3,827,672 | 8/1974 | Stanpfli | 137/625.65 X |
| 3,856,260 | 12/1974 | Giordano | 251/129 |
| 3,921,670 | 11/1975 | Clippard et al. . | |
| 4,052,997 | 10/1977 | De Lorenzo et al. | 137/312 |
| 4,230,156 | 10/1980 | Frantz | 137/625.65 X |
| 4,344,603 | 8/1982 | Hozumi et al. | 251/130 |

FOREIGN PATENT DOCUMENTS

| | | |
|---|---|---|
| 1998346 | 10/1965 | Fed. Rep. of Germany . |
| 81543 | 4/1971 | Fed. Rep. of Germany . |
| 2337886 | 7/1975 | Fed. Rep. of Germany . |
| 57-163772 | 10/1982 | Japan . |
| 367367 | 3/1963 | Switzerland . |
| 1201161 | 8/1970 | United Kingdom ............ 251/139 |

OTHER PUBLICATIONS

Gould Valve Catalog No. 178.
Bellows-Valvair Bulletin VL-63.
Burkert Catalog.
Mead Fluid Dynamics Catalog AV-3, p. 12.
Skinner (I) Catalog V70, p. 9.3.
Skinner (II) Catalog V80, p. 1.12.
Asco Catalog No. 30, p. 85.

Primary Examiner—Gerald A. Michalsky
Assistant Examiner—John C. Fox
Attorney, Agent, or Firm—Flynn, Thiel, Boutell & Tanis

[57] ABSTRACT

A three-way valve assembly having a reciprocable valve plunger movably controlled by a solenoid. The valve housing has an elastomeric orifice member seated thereon, which orifice member controls flow of pressure fluid from a source. The valve plunger has an enlarged nondeformable valve surface thereon which engages a projecting end portion of the orifice member for sealingly closing off the orifice.

20 Claims, 10 Drawing Figures

PLUNGER-TYPE VALVE

FIELD OF THE INVENTION

This invention relates to an improved solenoid valve assembly of the plunger type.

BACKGROUND OF THE INVENTION

Small electrically-operated valve assemblies, commonly referred to as solenoid valves, are widely utilized for purposes of controlling systems or other components, such as main flow-control valves, small pneumatic cylinders, etc. These solenoid valves are utilized extensively in pneumatic control systems, and conventionally are of the three-way type in that they are provided with supply and exhaust ports and additionally have a load port so that pressurized air can be utilized for controlling a primary system component such as a main flow-control valve. These solenoid valves, being utilized for control of small volumes of air, hence are of small size and every effort is made to minimize the size and maximize the efficiency of the solenoid so as to reduce the power requirements thereof. Additionally, reduced power requirements permit cost and size reductions of electrical control components. However, even though these solenoid valves are extensively utilized and many different variations thereof are manufactured and sold by many different manufacturers, nevertheless these known solenoid valves have still possessed structural and operational features which have been less than desired, and hence have created disadvantages relative to use of such valves, which disadvantages have nevertheless been tolerated and accepted in view of the inability of the industry to satisfactorily improve on these valves.

This conventional solenoid valve typically employs an elongated movable plunger disposed within and surrounded by a solenoid coil, the plunger being activated by the solenoid coil in opposition to the force of a spring. The plunger typically has a recess in the end thereof in which is positioned a pluglike sealing member, which sealing member is substantially constrained by its mounting within the plunger but has an exposed end face which is adapted to create a sealing engagement with an opposed seating surface disposed in surrounding relationship to a fluid supply orifice. This latter orifice communicates with the supply port for the pressure fluid and is normally formed either directly in a housing plate, or in a separate orifice member which is fixedly secured to the orifice plate. The orifice, at its discharge end, is surrounded by the seating surface, the latter typically being a metal surface which is of a convex conical configuration. This typical solenoid valve, while extensively utilized, has nevertheless possessed structural and operational features which have been considered less than optimum but have nevertheless been accepted in the absence of better alternative valves.

One of the disadvantages with this known solenoid valve is its electrical energy consumption, and hence the heat generated during valve operation. This type solenoid valve typically employs a plunger stroke of about 1-32nd inch. This stroke requirement hence increases the power requirement of the solenoid in order to effect movement of the plunger, which power requirement is further increased by the fact that the return force on the plunger as effected by the return spring proportionately increases in response to this increase in stroke. The electrical energy required for operating this typical solenoid valve has hence been an undesirable, yet accepted, operational feature.

A second disadvantage of the typical solenoid valve is that the accumulation of conventional manufacturing tolerances of the individual parts, when the valve is assembled, greatly effects the desired spacing between the plunger and the orifice seat. In fact, maintaining this spacing of small magnitude has been substantially impossible inasmuch as the accumulated tolerances often exceed the desired stroke. For this reason, many manufacturers have utilized an assembly technique which essentially requires preassembly of each individual solenoid valve so as to permit precise measurement of the actual gap or stroke between the plunger and the orifice seat, following which the valve is again disassembled and suitable adjustments made, such as installation of shims, so as to result in a stroke or gap within acceptable tolerances. Needless to say, this type of production procedure is extremely time consuming and costly. Also, many of the valves provide the conical orifice seat directly on a lower plate which forms a part of the valve housing, or in the alternative provide this conical orifice seat on a separate metal orifice member which must be press fitted or otherwise secured to a housing plate, and this obviously requires a time consuming and expensive machining operation in order to provide such conical orifice seat.

A third and very significant disadvantage of this typical solenoid valve is the substantial wear of the seal member which in most instances is mounted and confined within a recess formed in the end of the plunger. It has been observed that this seal member wears at a rate which greatly reduces the overall operational life of the valve in terms of the number of valve cycles which can be performed, prior to rebuilding of the valve and replacement of the seal member. Further, this excessive wear of the seal member also has an effect on the valve stroke, in that it tends to increase the required valve stroke to effect successful sealing, and increases the initial power requirements. Because of this, the power (and possibly also the allowable stroke) is normally increased significantly during the initial design of the valve in an attempt to compensate for the anticipated wear of the seal member. While the exact reasons for the more rapid wear of the seal member is not fully understood, nevertheless it is now believed that this accelerated wear is due to the fact that the elastomeric material of the seal member is repetitively subjected to compression whenever the plunger engages the conical seat so as to close off the orifice, and inasmuch as the seal member itself is closely confined within the plunger, the elastomeric material hence is subjected to substantial compression and cannot freely deform or expand outwardly away from the conical seat due to the substantial penetration of the latter into the central part of the seal member.

Still a fourth disadvantage of many typical solenoid valves is the increased wear experienced when the valve is mounted in a horizontal orientation. This typical valve normally provides excessive clearance between the plunger and the surrounding housing, which clearance permits the air to escape from the load port upwardly past the plunger through an exhaust port located adjacent the other end of the plunger. This excessive clearance, when the valve is mounted horizontally, causes substantial misalignment of the plunger and hence excessive wear thereon.

Accordingly, this invention relates to an improved plunger-type solenoid valve which is believed to overcome the above disadvantages. More specifically, the improved solenoid valve of this invention permits the stroke to be greatly minimized and rather precisely controlled so that the electrical energy required for valve actuation, and the related heat generation, are hence greatly minimized. This improved solenoid valve also minimizes and in some cases eliminates costly machining operations so that the valve can also be manufactured more efficiently and economically. This improved solenoid valve also provides an improved seal arrangement coacting between the plunger and the orifice, which in conjunction with the reduced stroke, greatly minimizes seal wear and hence greatly increases the operational life of the valve, while at the same time also permitting the valve to be manufactured and assembled with increased efficiency.

In the improved solenoid valve of this invention, there is provided a housing having an elongated plunger slidably supported therein, which plunger is surrounded by a solenoid winding. The plunger, at one end, terminates in an enlarged head disposed within an interior chamber, and a spring confined within this chamber reacts between the housing and the plunger head for urging the plunger into engagement with a conical seat which is formed on an orifice member for sealingly closing the orifice which extends therethrough. The orifice member is of a tubular construction and is of an elastomeric material, and is seated within the supply port so that the end portion of the orifice member, which end portion is conical and defines the conical seat thereon, projects into the interior chamber and is free of surrounding restraint. The opposed plunger head defines a metal seal face thereon in opposed relationship to the orifice member so that when the valve is closed, the rigid seal face on the plunger engages the conical end portion of the elastomeric orifice member, which causes limited deformation of the orifice member so as to sealingly close the orifice. The seal face on the plunger head contacts the orifice member so that the latter can freely expand radially outwardly in an unrestrained manner so as to minimize compressive deterioration of the orifice member while achieving a desired sealed engagement. The elastomeric orifice member is inserted into the supply port through the outer end thereof, which insertion occurs after the remainder of the valve has been assembled. The orifice member can be positioned so as to precisely control the gap between the plunger head and the orifice member, which gap (and hence plunger stroke) can be controlled so as to be in the range of 0.010 and 0.013 inch, thereby minimizing the energy requirements of the solenoid coil. The orifice member is compressively seated and stationarily held on the wall of the supply port so as to effect peripheral compressive and sealing engagement with the orifice member, whereby the provision of shoulders or other devices for axially restraining the orifice member is not required. The housing, and more specifically the coil spool, defines an opening therethrough which slidably guides the plunger by means of a close sliding fit. The spool is formed with a plurality of circumferentially spaced but axially elongated ribs so as to provide close slidable confinement of the plunger while resulting in minimum frictional engagement. At the same time, the grooves defined between the ribs function as passages for permitting exhaust air to flow past the plunger and through an exhaust port located adjacent the other end thereof. This latter exhaust port also has an elastomeric orifice member compressibly seated therein, which orifice member also terminates in a deformable conical nose portion which projects toward and is sealingly engageable with an enlarged rigid planar seal face formed on the opposed end of the plunger.

In the improved solenoid valve of this invention, the stroke can be maintained at a minimal amount, such as between 0.010 and 0.013 inch, in contrast to prior valves of this general type which have normally required a stroke of approximately 0.030. At the same time, this improved solenoid valve can be operated with approximately one-half watt of energy, whereas prior valves of comparable specifications have possessed higher energy requirements and have typically required an average of one to four watts for proper performance. In addition, initial testing of the improved solenoid valve of this invention indicates that, with this improved design and with utilization of the elastomeric orifice member, the valve has exhibited a useful life, as measured in terms of operational cycles, which is several times greater than the useful life of known solenoid valves. The elastomeric orifice member also enables the solenoid valve of this invention to be substantially fully assembled in its entirety prior to mounting of the orifice member, following which the orifice member can be inserted into the supply port from the outer end thereof to permit precise positioning thereof so as to maintain the desired stroke within very narrow limits, with the elastomeric orifice member being stationarily and sealingly seated on the valve housing due to elastic compression thereof.

In this solenoid valve, the supply port is preferably provided with an axially elongated cylindrical wall portion which surrounds the nose or orifice end of the orifice member and also surrounds a majority of the axial length of the orifice member. This wall portion is normally slightly oversized in relationship to the normal orifice member diameter so as to provide a small clearance therebetween, but this wall portion is also provided with an axially ribbed or knurled structure thereon, which ribs are circumferentially narrow and extend axially along the wall portion and project radially inwardly so that the plurality of ribs define an inner diameter which is smaller than the orifice member diameter. This plurality of circumferentially spaced ribs hence create localized compression and hence an interference fit with the orifice member in such manner as to stationarily and fixedly seat the orifice member within the supply port, while at the same time this compression of the orifice member by the circumferentially spaced ribs is such as to avoid distortion of the orifice or of the conical seat defined on the projecting end of the orifice member. A suitable adhesive is also preferably applied between the surrounding wall and the periphery of the orifice member which, in conjunction with the axially elongated ribs, greatly facilitates the insertion of the orifice member into the supply port without causing disruptive distortion of the orifice member, while at the same time enabling the orifice member to be properly stationarily seated. The adhesive effectively sealingly engages the orifice member to the surrounding wall.

Yet another improvement in this solenoid valve relates to the structure of the plunger and its cooperation with the orifice member for sealingly closing off the orifice. The plunger as disposed opposite the orifice member is preferably provided with a projection thereon, such as a semispherical projection, the latter being preferably provided by means of a ball fixedly seated within a shallow recess formed in the end of the plunger. This projection or ball has a diameter which is slightly larger than the orifice diameter, such as preferably about 1.5 times the orifice diameter, so that the ball will hence seat against the rounded edge which surrounds the outer end of the orifice. The spherical configuration of the ball permits it to effectively self-align and hence sealingly close off the orifice, even when the plunger is slightly misaligned. The projection or ball must be sized so as to create this self-aligning and sealing relationship with the orifice member, and thus must be slightly larger than the orifice diameter, but cannot be of greatly larger diameter since this would greatly minimize or restrict the desirable self-aligning and sealing relationship. However, the ball is sized so that it does not cause any substantial penetration of the orifice, and hence does not reduce the anticipated long life of the orifice member.

In this improved solenoid valve, the plunger is preferably provided with a radially enlarged platelike head which is positioned axially adjacent and in radially overlapping relationship with a frame plate of the solenoid so as to maximize the magnetic field, and hence minimize power requirements.

This improved solenoid valve also has an improved manual override associated therewith, which override employs an elastomeric ball coacting between the plunger head and the manually rotatable cam. This improved override enables the cam to be rotated a complete revolution, whereas the deformable ball compensates for dimensional variations which might otherwise interfere with cam rotation.

Other objects and purposes of the invention will be apparent to persons familiar with valves of this general type upon reading the following specification and inspecting the accompanying drawings.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will respectively refer to directions toward and away from the geometric center of the valve assembly and designated parts thereof. Said terminology will include the words specifically mentioned, derivatives thereof, and words of similar import.

DETAILED DESCRIPTION

Figure 1:
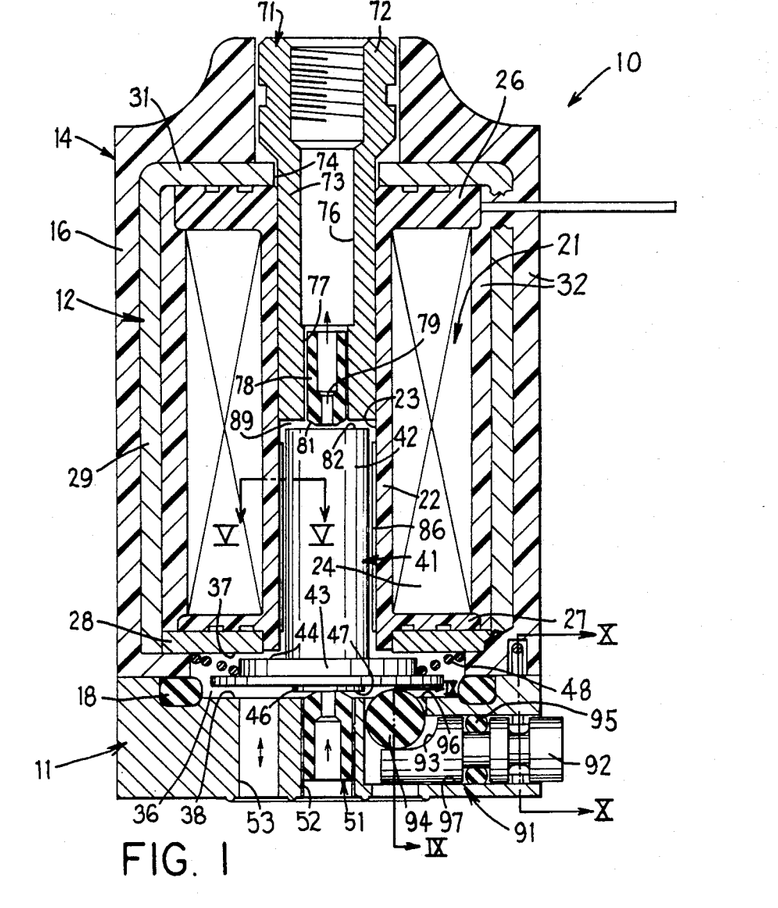
FIG. 1 is a longitudinal sectional view of the improved solenoid valve of this invention.

Referring to the drawings, FIG. 1 illustrates therein a solenoid valve assembly 10 according to the present invention, which valve is of the three-way type. This valve assembly 10 includes a valve portion 11 for controlling flow of pressure fluid, specifically air, and an operator portion 12 for controlling the opening and closing movement of the valve portion 11. The assembly includes a housing 14 which mounts thereon the portions 11 and 12.

The housing 14 includes an upper housing part 16 which is fixedly connectible to a lower housing part 17, the latter conventionally being referred to as the housing subbase. A conventional elastomeric O-ring 18 is compressively and sealingly engaged at the interface between the housing parts 16 and 17 for creating a sealed relationship therebetween.

Considering now the operator portion 12, same includes a solenoid subassembly 21 which includes a spool 22 having an elongated cylindrical opening 23 extending through the tubular core thereof, whereby a conventional electrical coil 24 is wound around the spool core 22 so as to be confined between the upper and lower end flanges 26 and 27, respectively. The spool 22 is normally constructed of glass-filled nylon.

A lower frame plate 28 is disposed under but is maintained in stationary engagement with the lower spool flange 27. This frame plate projects outwardly so that the opposite ends thereof are fixedly engaged with the lower free ends of a downwardly-opening, U-shaped upper frame member 29. This frame member 29 is disposed with the legs thereof on diametrically opposite, and hence straddling, relationship to the coil 24, and the frame member 29 has an upper bight plate 31 which overlies and is maintained in stationary engagement with the upper spool flange 26. The frame members 28 and 29 are of magnetically conductive material, such as iron, and hence define a path for the magnetic field generated upon energization of the electrical coil 24. The coil 24 and the frame members 28 and 29 are in turn suitably embedded within an electrical insulator material, such as a plastic resin, which totally surrounds the coil and frame members, and also fills the gap between the frame members and the coil, so as to provide a durable unitized structure.

An interior annular chamber 36 is formed within the housing, which chamber is formed substantially at the interface between the housing parts 16 and 17 and extends between a lower surface 37 of the frame plate 28 and an upper surface 38 on the subbase 17.

Considering now the valve portion 11, same includes a magnetically conductive valve plunger 41 having an elongated cylindrical stem 42, the latter being provided with an enlarged platelike valve head 43 at the lower end thereof. This valve head 43 is disposed within the interior chamber 36 and defines thereon an upper or rear surface 44 which is disposed in opposed relationship to the surface 37 formed on the frame plate 28. The valve head 43 has, on the lower free end thereof, a central projection 46 which is of a substantially cylindrical configuration and defines thereon a downwardly directed valve surface or seat 47, which surface is of an enlarged and planar configuration and is nondeformable due to the valve plunger 41 being constructed of a rigid nondeformable material such as a metal. This valve surface 47 is disposed in a plane which extends substantially perpendicular to the direction of movement of the valve plunger, which direction extends longitudinally of the plunger in coaxial alignment with the longitudinal axis of the solenoid coil. A tapered coil spring 48 of the compression type is positioned within the interior chamber 36 so that the large diameter end thereof bears against the surface 37, whereas the small diameter end thereof is seated on a stepped shoulder formed on the valve head 43 so as to normally urge the valve plunger 41 in a valve-closing direction.

In the illustrated embodiment, the valve head 43 is normally maintained in sealing engagement with a seat or orifice member 51, the latter being stationarily positioned within a supply port or opening 52 which extends perpendicularly through the subbase 17 in coaxial alignment with the valve stem 42 for permitting a pressure fluid to be supplied to the chamber 36. A further port or opening 53 also extends through the subbase 17 for communication with the chamber 36, which port 53 functions as a load port for permitting the pressure fluid to be supplied to or discharged from an external device, such as the pilot of a main flow control valve.

Figure 2:
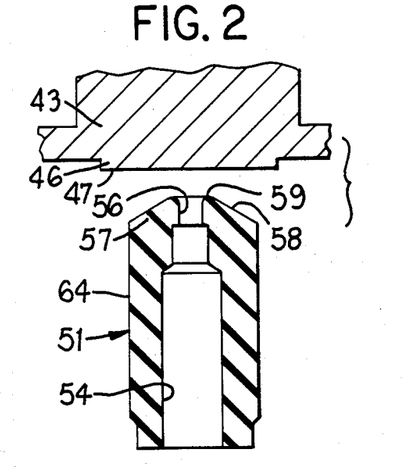
FIG. 2 is an enlarged sectional view of the elastomeric orifice member and its relationship to the plunger.

In the present invention, the orifice member 51 is constructed in its entirety of an elastomeric material and is of an elongated cylindrical configuration having an opening 54 (FIG. 2) extending coaxially therethrough. This latter opening 54 terminates, at its inner or discharge end, in a reduced diameter orifice 56 which controls the flow of pressure fluid from a source into the chamber 36. This orifice member 51 has an inner end portion 57 which is of a convex configuration, specifically a conical configuration, and which projects outwardly into the chamber 36 beyond the end wall 38 thereof whereby this projecting end portion 57 is hence free of surrounding restraint. This end portion 57 defines thereon a substantially conical end wall 58 which concentrically surrounds the orifice 56, which end wall 58 at its junction with the orifice 56 defines an appropriate rounded corner 59. This conical end surface 58, specifically in the vicinity of the rounded corner 59, hence functions as a seat for creating a sealed engagement with the valve surface 47 when the valve plunger 41 is in the closed position illustrated by FIG. 1.

Figure 3:
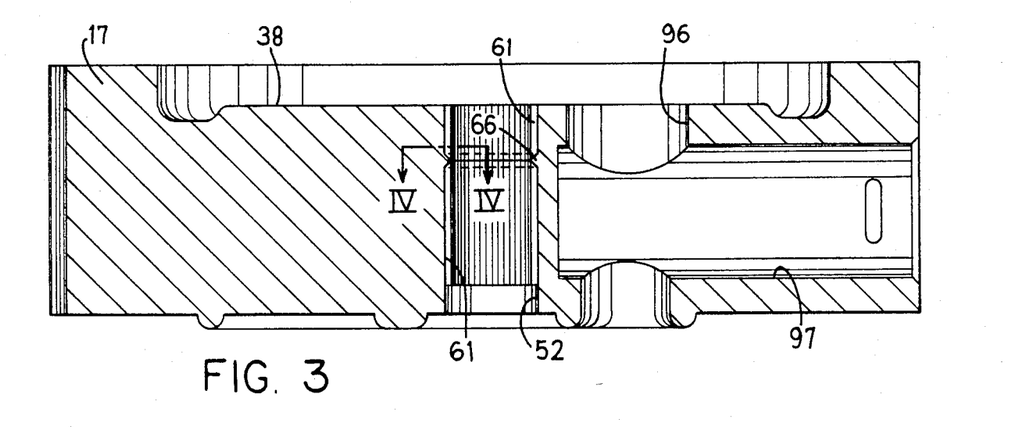
FIG. 3 is an enlarged sectional view of the housing subbase.
Figure 4:
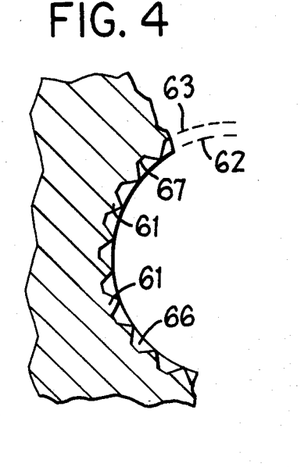
FIG. 4 is an enlarged, fragmentary sectional view taken substantially along line IV—IV in FIG. 3.

The elastomeric orifice member 51 is stationarily and sealingly seated within the opening 52 primarily due to elastomeric deformation of the peripheral portion of the member 51. The opening 52 is sized so as to enable the orifice member 51 to be inserted and positioned from the open exterior end of the opening 52 after the remainder of the valve assembly has been assembled. To stationarily and sealingly seat the orifice member 51 within the opening 52, the latter is provided with a plurality of ribs 61 (FIGS. 3 and 4) which extend axially of the opening 52 and are disposed in circumferentially spaced relationship. These ribs 61, as illustrated by FIG. 4, are of a substantially V-shaped cross section so that the tips of the ribs are defined by an inner diameter 62 whereas the base of the ribs are defined by a larger outer diameter 63. This inner rib diameter 62 is smaller than the outer diameter 64 of the orifice member 51 when the latter is in a nondeformed condition. Further, this outer undeformed diameter 64 of the orifice member preferably is slightly smaller than or possibly equal to the outer diameter 63.

The opening 52 also has a further rib 66 formed on the wall thereof, which rib 66 is annular in that it surrounds the opening 52 and is disposed intermediate the open ends thereof. This annular rib 66 is similar to the ribs 61 in that it is of a V-shaped cross section and has tip and base diameters corresponding to 62 and 63, respectively. This rib 66 forms a continuous ring which surrounds the opening 52 and extends perpendicularly across the axial ribs 61 so that the rib 66 effectively functions as a sealing rib when the orifice member is seated within the opening 52.

The elastomeric orifice member 51 is positioned within the supply port 52 by being pressed thereinto from the outer end (the lower end in FIG. 1) thereof. Since the uncompressed outer diameter 64 of the orifice member 51 is greater than the rib diameter 62, the axially elongated ribs 61 hence cause the orifice member 51 to compress but, in view of the presence of the axial grooves 67 between the ribs 61, the compression effect of the ribs 61 on the orifice member 51 is minimized, as is the friction, so as to enable the orifice member 51 to be slidably inserted into the supply port 52. Of course, the annular rib 66 effects compression of the orifice member 51 around the complete periphery thereof, although this is localized at a single peripheral band so that, after passing over this band, the peripheral elastomeric material of the orifice member again resiliently expands so as to substantially fill and occupy the grooves 67. Prior to insertion, the wall of the supply port 52 or the peripheral wall of the orifice member 51 is coated with a suitable adhesive, such as a "Locktite" brand adhesive, to assist in fixedly securing and stationarily and sealingly seating the orifice member in the supply port 52. The adhesive also reduces the force required to insert the orifice member into the supply port, which insertion occurs before the adhesive cures. Due specifically to the presence of the annular rib 66 and its interference fit with the orifice member 51 around the complete periphery thereof, this rib 66 particularly functions for both sealing and holding the orifice member 51 stationarily on the subbase 17.

The other end of the valve assembly 10 has a magnetically conductive top cap 71 associated therewith which, as illustrated in FIG. 1, comprises an elongated tubular element which is substantially coaxially aligned with and disposed opposite the other end of the valve plunger 41. This top cap 71 includes an enlarged head part 72 which is disposed within a central opening formed in the end wall of the upper housing part 16, which head part 72 is coaxially integrally joined with an elongated tubular part 73 of reduced diameter, the latter part 73 projecting coaxially into the spool opening 23. This tubular part 73 extends through a suitable opening formed in the, bight plate 31, which plate 31 and tubular part 73 are suitably fixed together, such as by a knurled connection 74.

The top cap 71 defines an elongated opening 76 extending coaxially therethrough, which opening 76 functions as an exhaust port or opening for the pressure fluid. This opening 76, at the inner or lower end of the tubular part 73, is of reduced diameter as indicated at 77, and an elastomeric seat or orifice member 78 is stationarily and sealingly seated within this reduced diameter opening 77. This orifice member 78 has to the same general construction as the orifice member 51 in that it is an elongated cylindrical tube having an opening therethrough which, at its lower end, defines an orifice 79 of small diameter. The lower end of the orifice member 78 projects outwardly beyond the lower end surface of the tubular part 73 and is of a conical configuration. This lower end part of the orifice member is hence unrestrained by the surrounding tubular part 73 and defines thereon a substantially conical valve seat 81 which surrounds the orifice 79. The lower projecting end of the member 78 is disposed opposite the upper end 82 of the valve stem 42, which end 82 defines an enlarged planar and nondeformable metal valve seat.

The elastomeric orifice member 78 is sealingly seated within the opening 77 by means of elastomeric compression of the member due to it being oversized relative to the diameter of opening 77, with the seating again being assisted by a suitable adhesive.

Figure 5:
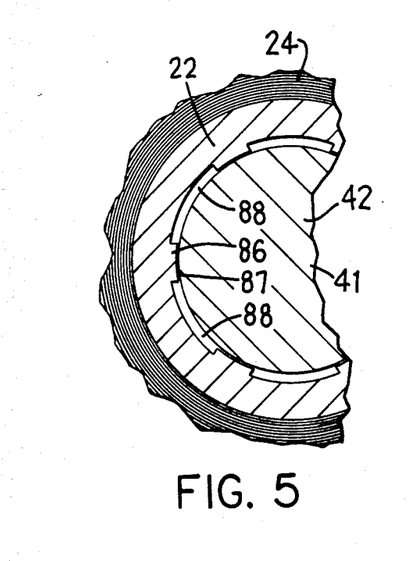
FIG. 5 is an enlarged, fragmentary sectional view taken substantially along line V—V in FIG. 1.

To provide for flow of exhaust fluid from chamber 36 to orifice 79, appropriate flow passages are provided within the spool core 22 in surrounding relationship to the valve stem 42. This is accomplished in the present invention by providing the spool core 22 with a plurality of axially elongated ribs 86 (FIGS. 1 and 5) which are integral with the spool core 22 and project radially inwardly thereof. These ribs 86 define thereon inner surfaces 87 which are generated on a diameter which is only a few thousandths of an inch greater than the outer diameter of the valve stem 42. These rib surfaces 87, of which there are a minimum number disposed in widely spaced relationship, hence provide for close guiding but slidable confinement of the valve stem 42 so that same can freely axially move within its permitted limits, while at the same time encountering little sliding friction. This close confinement of the valve stem 42 also permits the valve stem to remain properly aligned, even when the valve assembly is mounted so that the valve stem projects partially or totally in a horizontal direction. The widely spaced guide ribs 86 define therebetween a plurality of circumferentially spaced passages 88 which communicate at their lower ends with the interior chamber 36, and at the upper ends with the region 89 adjacent the upper end of the valve stem so as permit pressure fluid to be exhausted through the orifice 79 into the exhaust port 76.

To permit manual opening of the valve, such as when setting up equipment, the valve assembly is provided with an improved manually-controlled override 91. This override includes an elongated and substantially cylindrical actuator 92 which is rotatably supported within and projects outwardly of a transverse bore 97 formed in the subbase 11. A seal ring 95 seals the outer end of bore 97. This actuator 92, at its inner end, has a cam surface 93 thereon which is formed by removing approximately one diametrical half of the actuator rod. This cam cooperates with a ball 94 which is constructed of a deformable elastomeric material. The ball projects upwardly through an opening 96 formed in the surface 38 into a position for engagement with the lower surface of the valve head 43. By manually rotating the actuator 92, the cam surface 93 engages and suitably moves the ball 94 so that it is deformed upwardly against the valve head and, by exertion of sufficient pressure, the ball 94 moves the valve plunger 41 upwardly against the urging of spring 48 so as to open the supply port 52. The actuator 92 includes a reduced diameter part 98 which defines thereon a pair of diametrically opposed flats 99, and a U-shaped spring clip 100 is mounted on the housing and positioned so that the legs of the spring clip 100 straddle this reduced part 98. This clip prevents the actuator from being pulled outwardly of the housing, and at the same time functions as a resilient detent for permitting the actuator to be maintained in two positions which are angularly spaced 180° from one another, such as for maintaining the ball 94 in a lower position when the override is not being used, and for maintaining the ball in its upper position for opening the plunger when the actuator 92 is rotated 180° from the position illustrated in the drawings. The compressibility of ball 94 readily compensates for manufacturing tolerances so that the actuator 92 can hence be readily rotated through a complete revolution without binding.

Figure 6:
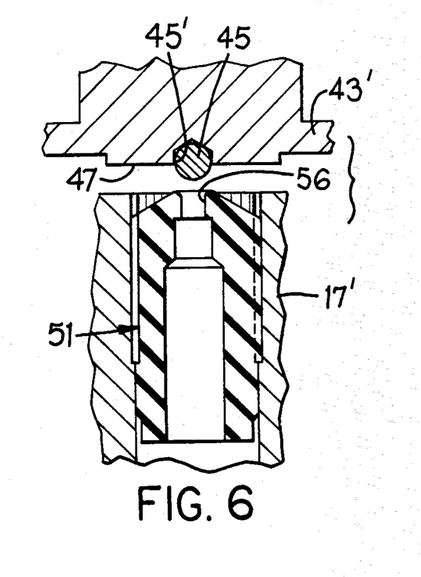
FIG. 6 is a view similar to FIG. 2 but illustrating a preferred variation as to the plunger.

Referring now to FIG. 6, there is illustrated a modified but preferred structure for the valve plunger. The drawing illustrates solely a portion of the valve plunger head, same being designated 43' to distinguish same from the valve plunger head 43 of FIG. 1. This modified valve plunger is provided with a blind recess 45' which opens inwardly of the head 43' from the end surface 47 thereof, which recess 45' is centrally positioned and substantially aligned with the orifice 56. A rigid ball or sphere 45 is fixedly seated within this recess 45', such as by a press fit. The ball 45 is disposed so that it projects outwardly beyond the planar end surface 47. This outward projection of the ball 45 beyond the surface 47 is slightly less than the ball radius. Further, the ball 45 has a diameter which is substantially greater than the diameter of orifice 56 and, in particular, the diameter of ball 45 is preferably in the range of 1.25 to about 1.75 (about 1.50 being preferred) times the diameter of orifice 56. This latter relationship creates a proper closing of the orifice while permitting a minimum stroke to be maintained.

With the modified valve plunger illustrated by FIG. 6, several additional improvements in the operation of the valve assembly have been observed. More specifically, even though misalignment between the valve plunger and the orifice member is maintained at a minimum due to the close sliding fit of the valve plunger within the spool core, nevertheless even a small amount of misalignment inherently exists. With this modified valve plunger of FIG. 6, the lower convex surface of the ball 45 defines the valve seat and hence tends to effectively self-align the plunger relative to the orifice during closing so as to always insure a proper sealing engagement between the elastomeric orifice member and the valve plunger. Further, due to this convex valve seat as defined by the ball 45, it has been observed that this results in a much more rapid closing or sealing off of the orifice 56 when the plunger is moved into the closed position, which is believed due not only to the self-aligning of the plunger as explained above, but also due to the manner in which the exterior surface of the ball 45 creates a more intimate sealing engagement with the projecting end of the elastomeric orifice member, such as the manner in which the ball moves into engagement with the rounded edge 59 which is formed at the outer end of the orifice 56.

Figure 7:
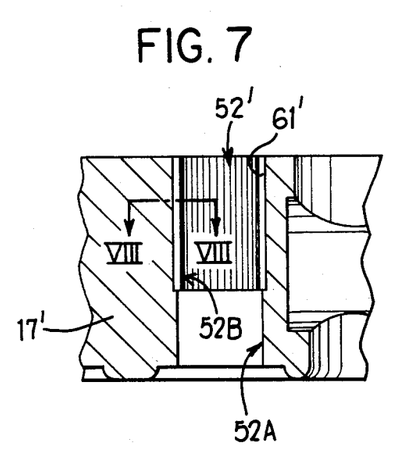
FIG. 7 is a fragmentary view similar to FIG. 3 but illustrating a preferred variation of the subbase.
Figure 8:
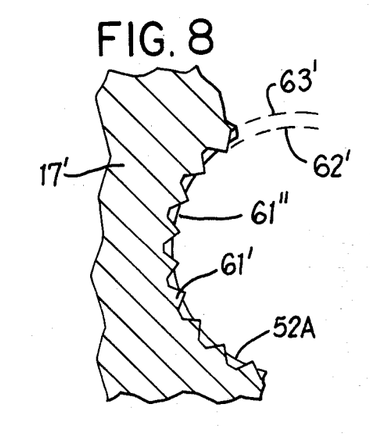
FIG. 8 is a fragmentary sectional view along line VIII—VIII in FIG. 7.
Figure 9:
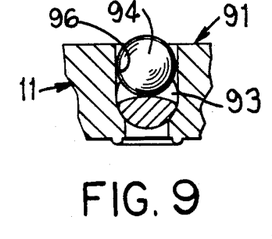
FIGS. 9 and 10 are fragmentary sectional views along lines IX—IX and X—X, respectively, in FIG. 1.
Figure 10:
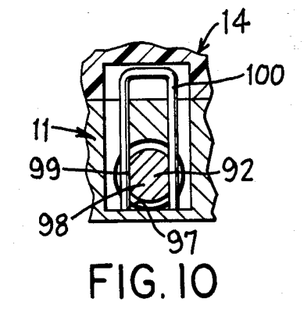

Referring now to FIGS. 7 and 8, there is illustrated a modified but preferred structure for the subbase and in particular a preferred seating arrangement associated with the supply port for mounting of the elastomeric orifice member. The same reference numerals are utilized in FIGS. 7 and 8 but have a prime (') added thereto to distinguish same from FIGS. 1-5. This subbase 17' has the supply port 52' extending therethrough, which supply port includes a lower or outer cylindrical portion 52A and an upper or inner cylindrical portion 52B. This upper bore 52B is again provided with an axially ribbed wall structure similar to that illustrated by FIGS. 3 and 4. More specifically, the ribbed wall structure of the bore portion 52B includes a plurality of axially elongated ribs 61' which are generally of V-shaped cross section and are closely but uniformly circumferentially spaced apart so that the cross section of the wall defining the bore 52B resembles a fluted or knurled configuration. These ribs 61', which are separated by appropriate grooves 61", are defined by tip and base diameters designated 62' and 63', respectively. The tip diameter 62' of the ribs is normally slightly smaller than the normal uncompressed outer diameter 64 of the orifice member 51 (for example being about 0.002 to about 0.005 inch smaller in diameter). Conversely, the base diameter 63' is larger than the uncompressed orifice diameter 64 (such as by about 0.002 to about 0.009 inch) than the orifice member diameter 64. As to the smooth wall bore 52A, its diameter is equal to or slightly smaller than (such as about 0.001 to 0.002 inch) the uncompressed diameter 64 of orifice member 52.

With this improved seating structure of FIGS. 7 and 8, the elastomeric orifice member 52 is slidably inserted into the supply port 52' by being inserted from the outer or lower end thereof, so that it is initially slidably pushed through the smooth wall bore 52A into engagement with the axially elongated ribs 61'. These ribs hence impose localized compression of the orifice member over a substantial axial length at a plurality of closely spaced circumferential locations so as to effect a secure holding and seating of the orifice member, while at the same time the compression of the orifice member is such that it is localized solely around the peripheral portion thereof inasmuch as the orifice member can expand between the ribs into the grooves 61'. In this manner, the small orifice 56 or the conical end seat 57 is not disturbed or distorted. Prior to insertion of the orifice member, the wall of the supply port 52' or the peripheral wall of the orifice member is coated with a suitable adhesive which, after the orifice has been properly seated within the port 52', effectively assists in fixedly securing the orifice member to the surrounding wall, and also creates a fluid-tight seal between the orifice member and the surrounding wall so as to prevent leakage past the outer wall of the orifice member. This annular seal is accomplished with assurance by provision of the smooth wall bore 52A which performs in a manner similar to the rib 66 illustrated in FIGS. 2 and 3, since this smooth wall bore hence defines an annular portion which creates a complete seal around the annular periphery of the orifice member.

OPERATION

While the operation of the valve assembly 10 is believed apparent from the above description, nevertheless the operation will be briefly reviewed to insure a complete understanding thereof.

In the illustrated embodiment, the valve 10 is normally maintained in a closed position substantially as illustrated by FIG. 1. In this position, the load port 53 is in continuous communication with the exhaust port 76 due to the valve plunger being urged downwardly by the spring 48 so that the upper valve seat 82 is hence spaced from the orifice member 78. In this lower or closed position, the spring 48 urges the lower valve seat (i.e. ball 45 or surface 47) into engagement with the projecting end of the orifice member 51 so as to sealingly close the supply orifice 56. When in this closed position, the valve seat 47 of FIG. 1 (or ball 45 of FIG. 6) engages the conical end surface 58 in the region of the rounded corner 59, which orifice member 51 undergoes limited elastic deformation and hence creates a narrow annular sealing area of engagement with the surface 47 (or ball 45) in surrounding relationship to the supply orifice 56. Since the end portion 57 of the member 51 is not closely surrounded or restrained, and inasmuch as the rigid valve surface 47 (or ball 45) is larger and hence does not penetrate the elastomeric material of the member 51, the orifice member material 51 due to the compression thereof by the valve surface 47 (or ball 45) can hence expand radially outwardly so as to minimize the compressive effect on the elastomer. This hence greatly minimizes the wear and deterioration of the elastomer so that the number of operational cycles (and hence the life) of the valve assembly is greatly increased while still providing a highly desirable sealed relationship between the valve plunger and the orifice member, even when working with pressures up to 100 psi.

In the present invention, the orifice members 51 and 78 are preferably formed of an elastomeric material which is relatively hard. For example, the elastomeric member 51 or 78 normally has a durometer hardness of at least 80, and preferably a hardness of between 90 and 100. Experimental evaluation has indicated that a durometer hardness of approximately 95 is highly desirable. The elastomeric material for the orifice member preferably comprises either buna rubber or a fluoroelastomer such as sold under the name "Viton".

When pressure fluid is to be supplied to the load port 53, then the solenoid coil 24 is energized so that valve plunger 41 is moved upwardly against the spring 48 so that the upper valve surface 82 engages the seat 81 and sealingly closes off the exhaust port 76, and simultaneously the supply seat 51 is uncovered such that pressure fluid flows through the supply port 52 into the chamber 36 and thence through the load port 53.

With the improved valve assembly of this invention, the actual stroke of the valve plunger when moving between its closed and opened positions, as determined by the sealed engagement between the plunger and the orifice members 51 and 78, respectively, can be maintained at a very small magnitude. For example, the stroke can be maintained in the range of between 0.010 and 0.013 inch. With this extremely small stroke, the energy requirement for the solenoid coil 24 can be minimized such that the valve can be operated with a very low current and power, such as approximately one-half watt. This low power requirement for the solenoid coil greatly increases the coil life, and permits the solenoid forces as imposed on the valve plunger to also be minimized which hence greatly increases the life of the valve seals as defined by the orifice members 51 and 78.

In addition, the elastomeric orifice member 51 is inserted and properly positioned after the remainder of the valve assembly has been assembled, due to the capability of the elastomeric member to be deformed and inserted through the outer end of the supply port. Hence, even though manufacturing tolerances may result in a substantial variation in the spacing between the valve plunger and the opposed housing surface, nevertheless the present invention permits simple and efficient compensation for these tolerances merely by measuring and positioning the orifice member during assembly thereof relative to the opposed rigid valve seat as formed on the valve plunger. Since the orifice member does not require seating against a preformed shoulder or seat formed on the housing, such as a housing seat or shoulder located at the outer end of the orifice member as in conventional constructions, the seating of the orifice member on the housing can hence be suitably adjusted during assembly so as to compensate for tolerances, thereby enabling the valve stroke to be precisely maintained within very narrow limits. This thus facilitates the utilization of a valve stroke which is substantially smaller than previously and conventionally utilized.

The elastomeric orifice member 51 or 78 is preferably formed by molding, and hence the orifice member can be precisely and accurately manufactured at a relatively rapid rate, whereby the orifice member is hence relatively inexpensive to manufacture, particularly in contrast to conventional manufacturing techniques wherein the conical member is machined from steel or the like. Further, by molding the orifice member from elastomeric material, the orifice member can be manufactured with many different orifice sizes, and hence provide greater selection and flexibility in terms of utilization of proper orifice diameter.

The efficiency of the valve assembly of this invention, specifically the small stroke and low energy requirements, are further enhanced by the design of the valve plunger and its relationship to the solenoid coil. Specifically, with the arrangement of this invention as illustrated by FIG. 1, the valve head 43 is disposed so that its rear surface 44 radially overlaps and is positionable in close proximity to the plate 28. This is permitted by the use of the small conical spring 48 which coacts between the plate and the rear shoulder formed on the valve head, whereby the valve head 43 is always positioned in close proximity to the plate 28 so as to maximize the effectiveness of the solenoid field in moving the valve plunger. This arrangement also allows for substantial radial tolerance or clearance between the plunger and the hole in plate 28 while still maximizing the generated magnetic force.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An electrically-operated plunger-type valve assembly, comprising:

housing means including first and second housing parts which are joined together and define an interior chamber at the interface therebetween;

electrical winding means stationarily associated with said first housing part and including a central sleevelike spool having an electrical winding therearound, said sleevelike spool defining therein an elongated central opening which extends along a central longitudinal axis of the winding means and opens into said interior chamber;

said winding means including a magnetically conductive frame disposed in surrounding relationship to said electrical winding, said magnetically conductive frame including an end plate which extends across one axial end of said winding means and has a central opening therethrough aligned with the central opening of said sleeve, said end plate defining an axial boundary for said interior chamber;

plunger means of a generally T-shaped configuration supported for limited reciprocal axial movement along said longitudinal axis, said plunger means including an elongated substantially cylindrical stem movably guidably supported within the central opening of said spool, said plunger means including a radially enlarged platelike head fixed to one end of said stem and positioned within said interior chamber, said platelike head projecting radially outwardly from said stem so as to substantially radially overlap said end plate, said head having a back face which is positioned in axially opposed relationship to said end plate and is separated therefrom by a narrow air gap;

first and second ports formed in said housing means and communicating with said interior chamber, said first port extending through said second housing part from an outer surface thereof for direct communication with said interior chamber, said first port being substantially coaxially aligned with said longitudinal axis;

a cylindrical orifice member of a stiff elastomeric material stationarily seated on said second housing part within said first port and defining a small-diameter orifice therethrough for communication with said interior chamber, said orifice member having an inner end defining thereon an end surface which is disposed axially opposite said head of said plunger means, said end surface defining thereon an annular valve seat in surrounding relationship to said orifice;

said orifice member being insertable into said first port from the axially outer end thereof so as to control the desired axial spacing between said valve seat and said head, said second housing part having a surrounding wall defining said first port which is free of shoulders and the like which would prevent the cylindrical orifice member from being axially slidably inserted into said first port from the outer end thereof, said orifice member being stationarily held in position within said first port by means of a compressive interference fit between the periphery of the orifice member and the surrounding wall of the first port, said surrounding wall over at least a portion of the axial extend thereof including a plurality of ribs which project radially inwardly for compressively deforming the peripheral portion of the orifice member for stationarily seating the orifice member on the second housing part, said plurality of ribs being circumferentially spaced around the first port and extending axially thereof to permit the orifice member to be axially slidably inserted into said first port; and said head of said plunger means defining thereon a nondeformable front face which is disposed axially opposite said annular valve seat and is positioned closely adjacent same, said front face sealingly engaging said valve seat when said plunger means moves into engagement with said orifice member to define a valve closing position.

2. A valve assembly according to claim 1, wherein the head of said plunger means has a ball-like member which is fixed thereto and which projects outwardly from the front face thereof and is substantially coaxially aligned with the orifice so as to engage the annular valve seat to close off the orifice when the plunger means is in its closed position, said ball-like member having a diameter which is no greater than about two times the diameter of said orifice.

3. A valve assembly according to claim 2, wherein said orifice member has an annular portion at the inner end thereof which is free of surrounding restraint by said surrounding wall so as to be readily radially deformable in response to sealing engagement of said head against said valve seat.

4. A valve assembly according to claim 1, wherein the surrounding wall defining said first port includes a continuous nonribbed annular portion which surrounds the orifice member at a location spaced axially outwardly from said ribs so as to effectively form a complete ring which surrounds and sealingly engages the orifice member.

5. A valve assembly according to claim 4, wherein the ribs are defined by tip and base diameters which are respectively smaller and larger than the normal uncompressed outer diameter of the orifice member, and wherein the nonribbed annular portion of the surrounding wall has a diameter which is slightly less than or equal to the outer uncompressed diameter of the orifice member.

6. A valve assembly according to claim 5, wherein said orifice member is constructed of an elastomer having a durometer hardness in the range of from 90 to 100.

7. A valve assembly according to claim 6, wherein said elastomeric orifice member has an annular end portion at the inner end thereof which is of a conical configuration and projects outwardly of the orifice member so as to be free of restraint by the surrounding housing, said end portion defining thereon said valve seat.

8. A valve assembly according to claim 1, including a third port formed in said housing means and opening outwardly thereof, said third port being formed in said first housing part in substantial coaxial alignment with said longitudinal axis, said third port having a second elastomeric and substantially cylindrical orifice member mounted therein and having an orifice of small diameter opening therethrough, said second elastomeric orifice member having a conically projecting end portion which surrounds said orifice and which is disposed opposite a flat, nondeformable end surface formed on the other end of said plunger means, said second orifice member being sealingly engaged with said last-mentioned end surface when said plunger means is in an open position.

9. An electrically-operated plunger-type valve assembly, comprising:

housing means including first and second housing parts which are joined together and define an interior chamber at the interface therebetween;

electrical winding means stationarily associated with said first housing part and including a central sleevelike core having an electrical winding therearound, said sleevelike core defining therein an elongated central opening which extends along a central longitudinal axis of the winding means and opens into said interior chamber;

plunger means supported for limited reciprocal axial movement along said longitudinal axis and being movable between valve closing and opening positions in response to energization of said electrical winding, said plunger means including an elongated substantially cylindrical stem movable along the central opening of said spool, said stem having a head end which projects into said interior chamber;

first and second ports formed in said housing means for communication with said interior chamber, said first port extending through said second housing part from an outer surface thereof for direct communication with said interior chamber, said first port being substantially coaxially aligned with said longitudinal axis;

a cylindrical orifice member of a stiff elastomeric material stationarily seated on said second housing part within said first port and defining a small-diameter orifice therethrough for communication with said interior chamber, said orifice member having an inner end which communicates with said interior chamber, the inner end of said orifice member defining thereon a deformable end surface which is disposed axially opposite the head end of said plunger means, said deformable end surface defining thereon an annular valve seat in surrounding relationship to said orifice;

the head end of said plunger means defining thereon a nondeformable end surface which is disposed in axially opposed relationship to the deformable end surface of said orifice member and is adapted to sealingly engage the latter when said plunger means is in said valve closing position, at least one of said deformable and nondeformable end surfaces being of an outwardly projecting and smoothly curved convex configuration, said plunger means when in said valve closing position having the head end thereof engaged solely with the valve seat on said orifice member;

said orifice member being insertable into said first port from the axially outer end thereof to control the desired axial spacing between said deformable and nondeformable end surfaces, said second housing part having a substantially cylindrical surrounding wall defining said first port which is free of axially outwardly-facing shoulders or obstructions which would prevent the cylindrical orifice member from being axially slidably inserted into the first port from the axially outer end thereof;

said orifice member being stationarily and sealingly held in position within said first port primarily by means of a compressive interference fit between the circumferential periphery of the orifice member and the surrounding wall of the first port, said surrounding wall over at least a substantial portion of the axial extent thereof including a plurality of ribs which are circumferentially spaced around the first port and extend substantially axially thereof to permit the orifice member to be axially slidably inserted into said first port, said ribs projecting radially inwardly for compressively deforming the circumferential peripheral portion of the orifice member for stationarily seating the orifice member on the second housing part;

said surrounding wall also including a continuous annular portion which surrounds the orifice member and has a diameter which is slightly less than or equal to the outer uncompressed diameter of the orifice member to effectively form a complete ring which surrounds and sealingly engages the orifice member.

10. A valve assembly according to claim 9, wherein said plunger means includes a platelike head which is positioned within said interior chamber and is fixedly secured to and defines the end of said stem and projects radially outwardly therefrom, said platelike head having an enlarged and substantially planar front surface which is disposed in axially opposed relationship to the deformable end surface defined on said orifice member, said platelike head having a portion which is positioned centrally of and projects outwardly from said front surface and defines thereon said nondeformable end surface in directly opposed relationship to the deformable end surface on said orifice member, said nondeformable end surface being of said convex configuration.

11. A valve assembly according to claim 10, wherein said platelike head has a blind recess positioned centrally thereof and opening inwardly from said front surface, said projecting portion comprising a rigid spherical ball which is seated within said recess and fixedly secured to said platelike head so that at least a portion of the ball projects outwardly beyond said front face, said ball defining thereon said nondeformable end surface, said ball having a diameter of about 1.25 to about 1.75 times the diameter of the orifice which opens through the deformable end surface defined by the orifice member.

12. A valve assembly according to claim 10, including manual override means for moving said plunger means into said valve opening position, said override means, including an actuator rotatably supported on said second housing part within a bore which extends substantially transversely with respect to said first port, said actuator having eccentric cam means associated with the inner end thereof, said second housing part having an interior opening therein which provides communication between said interior chamber and said last-mentioned bore in the vicinity of said cam means, and a ball of deformable elastomeric material positioned within said interior opening and disposed in engagement with said cam means, said deformable ball being positioned close to but normally spaced axially from the front face of said platelike head so as to be free of interference with said platelike head when said plunger means moves between said valve opening and closing positions, the rotation of said actuator causing the eccentric cam means to move the deformable ball into the interior chamber for engagement with the front face of the platelike head to effect movement of the latter into said valve opening position.

13. A valve assembly according to claim 12, wherein said actuator associated with said override means is rotatable through a complete revolution, and resilient detent means coacting with the rotatable actuator for maintaining same in first and second positions spaced approximately 180° from one another, said actuator when in said first position permitting said deformable ball to be maintained out of engagement with said plunger means, and said actuator when in said second position maintaining said deformable ball in compressive engagement with said plunger means for holding the latter in said valve opening position.

14. A valve assembly according to claim 9, wherein said elastomeric orifice member has a substantially cylindrical outer surface of substantially uniform diameter which extends over substantially the entire axial length of the orifice member when the latter is in an uncompressed condition.

15. A valve assembly according to claim 14, wherein the elastomeric material of the orifice member has a durometer hardness of at least 80.

16. In a valve assembly having a housing defining therein first and second ports, valve means for controlling flow of fluid between said first and second ports, said valve means including seat means stationarily mounted on said housing, said seat means having a small orifice therethrough for regulating flow between said ports, said valve means also including plunger means movably supported on said housing and being movable between a closed position wherein the plunger means engages the seat means to close off the orifice and an open position wherein the plunger means is spaced from the seat means to permit flow through the orifice, and operator means including electrical winding means for controlling movement of the plunger means between said open and closed positions, comprising the improvement wherein:

said housing includes therein an interior chamber which communicates with said first and second ports;

said electrical winding means surrounds an elongated sleevelike core which defines therein an elongated central opening which opens into said interior chamber from one side thereof, and an electrical winding wound around said core;

said first port projecting inwardly from an exterior surface of said housing for communication with said interior chamber adjacent the other side thereof, said first port being substantially coaxially aligned with the central opening defined by said sleevelike core;

said plunger means including an elongate stem which projects into said central opening and is axially movable therealong for movement of said plunger means between said open and closed positions, said stem having a head end which projects into said interior chamber;

said seat means being defined by an axially elongated and substantially cylindrical orifice member which is positioned within said first port and is stationarily seated on said housing, said orifice member being of a stiff elastomeric material having a durometer hardness of at least 80;

said orifice member having an annular end portion at one end thereof which projects into said interior chamber and is free of restraint by the surrounding housing, said end portion defining thereon an exposed deformable end surface which is disposed axially opposite the head end of said plunger means, said orifice member having an opening extending coaxially therethrough, which said opening terminates in a small-diameter orifice which opens through said deformable end surface, said deformable end surface defining a deformable valve seat which concentrically surrounds said orifice;

said first port being substantially cylindrical and including an axially elongated and substantially cylindrical surrounding wall means which defines a plurality of radially-inwardly projecting ribs which elastically compress and deform the peripheral portion of the orifice member for stationarily seating the orifice member on the housing, said ribs being circumferentially spaced around the first port and being axially elongated for engaging the outer periphery of the orifice member over a majority of the axial length thereof, said ribs being defined by tip and base diameters which are respectively smaller and larger than the normal uncompressed outer diameter of the orifice member;

said surrounding wall means defining said first port also including a continuous annular portion having a diameter slightly less than or equal to the outer uncompressed diameter of the orifice member for surrounding the orifice member to effectively form a complete ring which surrounds and sealingly engages the orifice member; and said head end of said plunger means defining thereon a nondeformable end surface which is disposed axially opposite said deformable end surface and is adapted to sealingly engage the latter when the plunger means is in said closed position, said nondeformable end surface having a nondeformable surface portion which is of a smoothly curved convex configuration and which is adapted to sealingly engage said deformable valve seat when said plunger means is in said closed position.

17. A valve assembly according to claim 16, including adhesive means disposed between said orifice member and said surrounding wall means to assist in sealingly and stationarily seating the orifice member within said first port, said orifice member being axially located and stationarily seated within said first port solely due to said adhesive means and the radial compression between said orifice member and said surrounding wall means.

18. A valve assembly according to claim 17, wherein the annular end portion of said orifice member is of a substantially conical configuration which projects axially outwardly toward the head end of the plunger means and has said orifice defined substantially at the apex thereof.

19. A valve assembly according to claim 16, wherein the annular end portion of said orifice member is of a substantially conical configuration which projects axially outwardly toward the head end of the plunger means and has said orifice defined substantially at the apex thereof.

20. A valve assembly according to claim 16, wherein said housing has a third port formed therein and communicating with the other end of said central opening, a second substantially cylindrical and elastomeric orifice member stationarily seated in said third port and having a small-diameter orifice extending therethrough for communication with said central opening, said second orifice member having a substantially conical and outwardly projecting annular end portion which projects axially toward the plunger means and has said last-mentioned orifice extending through the apex thereof, and said stem having a substantially flat and nondeformable end surface formed on the other end thereof and disposed axially opposed to the second orifice member for sealingly engaging and closing the orifice thereof when said plunger means is in said open position.

* * * * *